United States Patent [19]
Greenwood

[11] 3,764,897
[45] Oct. 9, 1973

[54] ELECTROMAGNETIC THICKNESS GAUGING USING A TRANSMITTING COIL SHAPED TO PROVIDE A CONSTANT FIELD OVER A RANGE OF MEASURING DISTANCES

[75] Inventor: Ivan A. Greenwood, Stamford, Conn.

[73] Assignee: The Singer Company, Little Falls, N.J.

[22] Filed: Dec. 28, 1971

[21] Appl. No.: 212,899

[52] U.S. Cl.............................. 324/40, 324/34 TK
[51] Int. Cl............................................. G01r 33/00
[58] Field of Search........................... 324/40, 34 TK

[56] References Cited
FOREIGN PATENTS OR APPLICATIONS

| | | | |
|---|---|---|---|
| 196,416 | 7/1967 | U.S.S.R. | 324/34 TK |
| 232,583 | 4/1969 | U.S.S.R. | 324/40 |
| 252,631 | 2/1970 | U.S.S.R. | 324/40 |
| 260,189 | 5/1970 | U.S.S.R. | 324/34 TK |

OTHER PUBLICATIONS

Dodd; C. V.; Applications of a Phase Sensitive Eddy Current Inst., Mat. Eval.; June 1964, pp. 260–262 & 272.

Primary Examiner—Robert J. Corcoran
Attorney—S. A. Giarrantana et al.

[57] ABSTRACT

In an electromagnetic thickness gauge a transmitting coil induces eddy currents in a conducting sheet the thickness of which is to be measured. The phase angle of the magnetic field generated by the eddy currents relative to the field generated directly by the transmitting coil provides the measure of thickness. The magnetic field generated by the transmitting coil is shaped so that the phase angle measurement is substantially constant as the distance between the sheet and the transmitting coil changes. This constant phase angle is achieved by designing the coil to produce an electromagnetic field in which the scalar magnetic potential varies as a single exponential over a selected range of distances from the transmitting coil. Two eddy current measurements in which the phase angles are different functions of the thickness and conductivity are taken so that both the thickness and conductivity can be determined from the two measurements by solving simultaneous equations.

18 Claims, 8 Drawing Figures

INVENTOR
IVAN A. GREENWOOD
S.A. GIARRATANA
BY T.W. KENNEDY
ATTORNEYS

ELECTROMAGNETIC THICKNESS GAUGING USING A TRANSMITTING COIL SHAPED TO PROVIDE A CONSTANT FIELD OVER A RANGE OF MEASURING DISTANCES

BACKGROUND OF THE INVENTION

This invention relates to a thickness gauge, and more particularly to a thickness gauge which measures thickness by the phase angle of the field generated by the eddy currents induced in a conducting sheet, the thickness of which is to be gauged.

Prior to the present invention, a thickness gauge which measures the thickness of a metal sheet by the phase angle of the field generated by induced eddy currents was known. In this thickness gauge of the prior art an AC signal is applied to a transmitter coil placed near the sheet which is to have its thickness measured. The transmitting coil generates a magnetic field which induces eddy currents in the sheet. The induced eddy currents also produce a field which is detected by a receiving coil. A second set of transmitting and receiving coils not affected by the eddy currents induced in the sheet is used in conjunction with the first mentioned transmitting and receiving coils in order to determine the phase of the field component generated by the eddy currents relative to the field generated directly by the transmitting coil. This phase angle will depend upon both the thickness and conductivity of the conducting sheet so if the conductivity is known, the thickness can be determined, and vice versa.

In the above described thickness gauge of the prior art, the phase angle varies with the distance of the transmitting and receiving coils from the conducting sheet being gauged. As a result, in those applications in which the distance between the conducting sheet being gauged and the transmitting and receiving coils cannot be maintained constant, precise thickness measurements cannot be obtained. Moreover, in those applications in which the conductivity of the metal sheet is not known, thickness measurements cannot be obtained. These deficiencies in the above described thickness gauge make it impractical for measuring thickness of sheet metal as it is being manufactured. In such an application there is considerable transverse movement of the metal sheet being manufactured, making it difficult to maintain a constant distance between the metal sheet and a transmitting and receiving coil. In addition, the conductivity of the metal sheet will vary thus causing further errors in the thickness measurement obtained.

SUMMARY OF THE INVENTION

In the thickness gauge of the present invention the transmitting coil is designed so as to generate a magnetic field so shaped that the phase angle of the sensed field due to the induced eddy currents is substantially invariant with the distance between the metal sheet and the coil. This constant phase angle is achieved by designing the coil to produce a magnetic field in which the magnetic scalar potential varies as a single exponential over a selected range of distances from the transmitting coil. The problem of variable conductivity is solved by taking two eddy current measurements in which the phase angle varies in a different manner with variation in the thickness and conductivity. Both the thickness and conductivity can then be determined from the two measurements by solving simultaneous equations. In one embodiment, the first measurement is made at a relatively low frequency in which the phase angle determined is proportional to the inverse of the product of the conductivity and the thickness, and a second measurement is made at a high frequency in which the phase angle is proportional to the inverse of the square root of the conductivity and does not vary with thickness. In both these measurements, the receiving coil is placed on the same side of the metal sheet as the transmitting coil, and may be the same coil.

In a second embodiment, one measurement is made with the receiving coil on the same side of the metal sheet as the transmitting coil and the other measurement is made with the receiving coil on the opposite side of the metal sheet from the transmitting coil. In this latter embodiment, the frequency of the signal applied to the transmitting coils is varied until the phase angles detected in both measurements are the same or have a predetermined difference.

At this point of phase equality or predetermined phase difference, the phase angles will provide a measure of the thickness of the metal sheet independent of the conductivity of the metal. The varying the frequency until the phase angles obtained from the two measurements are equal or have a predetermined difference in effect is a solution to the two equations for the phase angles represented by the two measurements.

DESCRIPTION OF THE PREFERRED EMBODIMENTS

Figure 1:
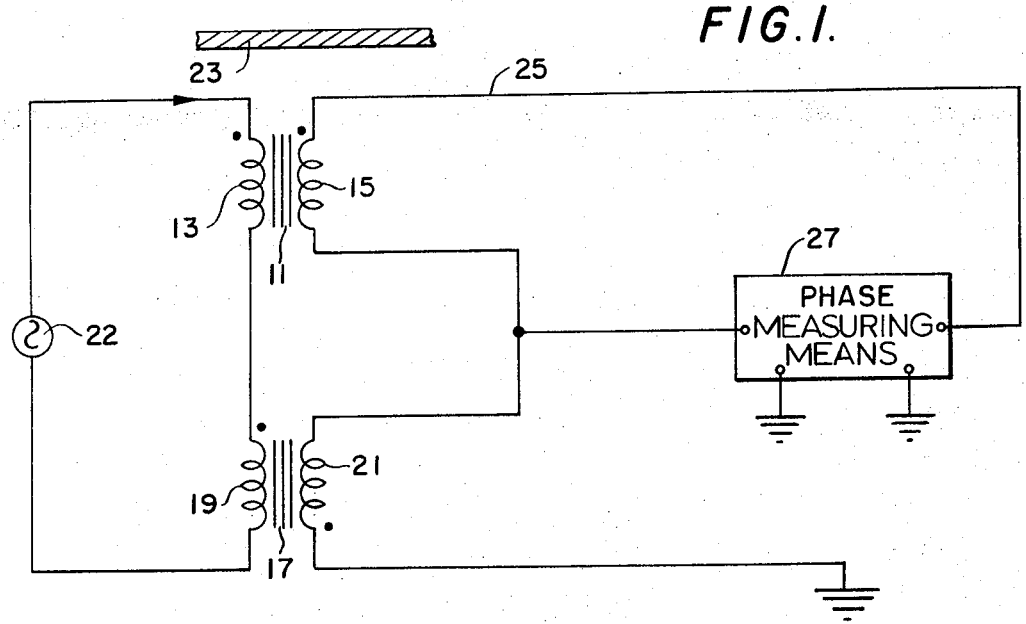
FIG. 1 is a circuit illustrating how the phase angle is measured in the thickness gauges of the present invention.

The basic circuit of the electromagnetic thickness gauge of the present invention is shown in FIG. 1. As shown in FIG. 1, the gauge comprises a transformer 11 having a primary winding 13 and a secondary winding 15 and a transformer 17 having a primary winding 19 and a secondary winding 21. The transformer 11 comprises the probe of the eddy current gauge and the transformer 17 provides a reference phase signal utilized as described below. The primary windings 13 and 19 are connected in series across the output of an oscillator 22, so that the primary windings of the two transformers are energized in phase. The transformer 11 is placed near the electrically conducting sheet 23, the thickness of which it is desired to measure, so that the eddy currents induced in the sheet will generate a magnetic field, which will induce a signal component in the secondary winding 15. The magnetic field generated directly by the primary winding 13 will also induce a signal component in the secondary winding 15, so that the resulting signal induced in the winding 15 will have two components, one due to the field generated directly by the signal applied to the primary winding 13 and one due to the field generated by the eddy currents induced in the conducting metal sheet 23. The transformer 17 is identical to the transformer 11, so the secondary winding 21 will have a signal induced therein equal in amplitude and phase to the component of the signal induced in the secondary winding 15 due to the field generated directly by the primary winding 13. Accordingly, if the signal generated in the secondary winding 21 is subtracted from the signal generated in the secondary winding 15, the phase of the signal resulting from the subtraction will be the phase of the component due to the eddy currents induced in the conducting sheet 23. The secondary windings 15 and 21 are connected in series with opposite polarity between a conductor 25 and ground so that the signal voltage produced between conductor 25 and ground will be equal to the difference between the signal voltage induced in the secondary winding 15 and the signal voltage induced in the secondary winding 21, and accordingly will be equal in phase and amplitude to the component of the signal induced in the secondary winding 15 caused by the eddy currents induced in the conducting sheet 23. A phase sensor circuit 27 is connected to measure the phase difference between the signal voltage produced between the conductor 25 and ground and the signal voltage produced by secondary winding 21 and produces a signal indication of this phase difference. This phase difference, which is designated as a phase angle $\theta$, will be equal to the difference in the phase angle of the component of the electromagnetic field generated by the eddy currents in the conducting sheet 23 and the component of the field generated directly by the source winding 13. The tangent of this phase angle under proper conditions will be proportional to the inverse of the product of the conductivity of the sheet 23 and the thickness of the sheet 23.

The eddy current gauge thus far described is the same as that described by W. A. Yates and J. L. Queen in the May 1954 issue of AIEE Transactions, Part I, *Communications and Electronics*, 73, pp. 138–142. This eddy current gauge disclosed by Yates and Queen purportedly is able to measure the thickness of the conducting sheet independent of the distance of the probe from the sheet. However, this independence is achieved only to a poor approximation if a conventional coil structure is used as the probe. If the distance between probe and the sheet varies, the thickness cannot be determined with precision. In addition, the phase angle is also dependent upon the conductivity so if the conductivity is unknown, the thickness cannot be determined.

Figure 2:
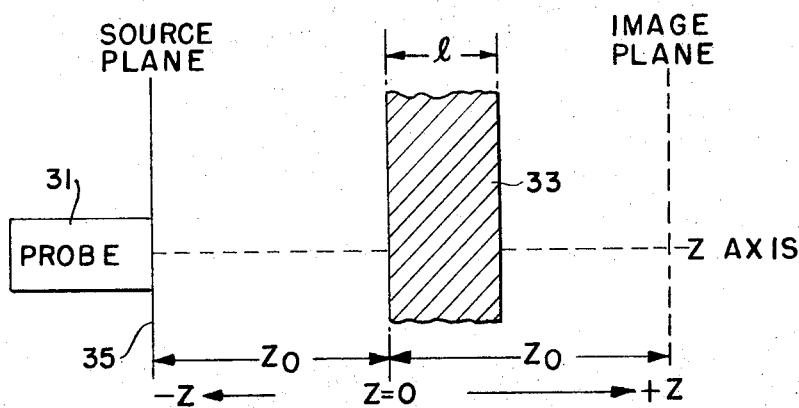
FIG. 2 schematically illustrates an idealized system used to explain the theory of operation of the thickness gauge of the present invention.

The manner in which the phase angle of the electromagnetic field due to eddy currents is dependent upon the thickness and conductivity of the metal sheet can be analyzed by magnetic field theory. The idealized system is illustrated in FIG. 2, in which the probe is designated by the reference number 31 and the metal sheet in which the eddy currents are induced in represented by the reference number 33. The probe 31 includes a source coil corresponding to the primary winding 13 in the circuit of FIG. 1 and a pick-up coil corresponding to the secondary winding 15 in the circuit of FIG. 1. The source and pick-up coils have circular symmetry about an axis, referred to as the z-axis, perpendicular to the planes of the surfaces of the sheet 33. The source of the probe 31 points toward the sheet 33 along the z-axis from a plane 35, perpendicular to the axis at a distance $z_0$ from the top surface of the sheet 33. The thickness of the metal sheet 33 is designated $l$, the conductivity of the metal is designated $\sigma$, and the relative permeability is designated $\mu$. The planar dimension of the sheet 33 is assumed to be sufficiently large relative to $z_0$ and the dimensions of the probe 31 so that edge effects in the sheet can be neglected.

It is convenient to approach the problem of field analysis in terms of the vector potential $\vec{A}$. In the region of free space the vector Laplace's equation is $\nabla^2 \vec{A} = 0$. If $\vec{A}$ is resolved into its components in cylindrical coordinates symmetrical about the z-axis, the only non-vanishing component of $\vec{A}$ is $A_\phi$, which is the symbol for the component of $\vec{A}$ extending in a tangential direction from a circle centered on the z-axis. The vector Laplace's equation in the cylindrical coordinates system reduces to:

$$(\delta^2 A_\phi/\delta r^2) + (1/r)(\delta A_\phi/\delta r) + (\delta^2 A_\phi/\delta z^2) - (A_\phi/r^2) = 0. \tag{1}$$

In equation 1 the time variation of $A$ has been omitted to simplify the equation, since it does not affect the analysis. The appropriate solution of equation 1 is:

$$A_\phi = \sum_i a_i J_1(q_i r) e^{-q_i z}, \tag{2}$$

in which $a_i$ is a constant representing the amplitude of the $i^{th}$ term of the summation, $q_i$ is a real constant of the $i^{th}$ term referred to as the separation constant, and $J_1(q_i r)$ is the Bessel function of the first kind and first order having the argument $q_i r$. The notation of equation (2) showing the solution for $A_\phi$ as a summation means that the value of $a$ and the value of $q$ may be selected arbitrarily in the expression $aJ_1(qr)e^{-qz}$ and the resulting function would be a valid solution for $A_\phi$ and that any summation of valid solutions will also be a valid solution for $A_\phi$ of equation 1.

According to Ohm's law, the current density $J$ inside the metal can be expressed as follows:

$$\vec{J} = \sigma \vec{E}, \tag{3}$$

in which $\sigma$ = conductivity, and $\vec{E}$ = electric field.

For metals of high conductivity, displacement current can be neglected, and since the divergence of $\vec{A}$ is 0 ($\nabla \cdot \vec{A} = 0$), Poisson's equation becomes:

$$\nabla^2 \vec{A} = -\mu \mu_0 \vec{J}, \tag{4}$$

in which $\mu$ is the relative permeability of the material and $\mu_0$ is the permeability of free space.

From Faraday's law of induction the electric field $\vec{E}$ can be expressed in terms of the vector potential $\vec{A}$ as follows:

$$\vec{E} = -(\delta \vec{A}/\delta t),\qquad(5)$$

The vectors of the electromagnetic field are assumed to vary sinusoidally with time at the frequency of the signal applied to the source coil of the probe 31. This time dependence can be expressed in the form $e^{j\omega t}$ in which $\omega$ is the angular frequency of the signal applied to the source coil. Physical quantities are represented by the real parts of the complex equations. Accordingly, equation 4 can be reduced to a vector diffusion form of the vector Helmholtz equation:

$$\nabla^2 \vec{A} = +j\mu\mu_0\omega\sigma\vec{A} \equiv -\chi^2\vec{A},\qquad(6)$$

The solution for the tangential component of $A$ travelling in the $+z$ direction is:

$$A_\phi = \sum_i a_i J_1(q_i r) e^{-\gamma z},\qquad(7)$$

where $$\gamma = (-\chi^2 + q_i^2).$$

Each different solution given for $A_\phi$ for each different value of $q_i$ may be considered to be a different mode of $A_\phi$ characterized by its specific separation constant $q_i$. Since each mode of $A$ acts independently of other modes of $A$, for purposes of analysis a single mode may be considered by itself and then by the principle of superposition a summation taken of all modes to mathematically describe $A_\phi$.

$A_\phi$ may be considered to consist of two components. One is generated directly by currents flowing in the source coil of the probe 31 and one is generated by eddy currents flowing in the metal sheet 33. The component of $A_\phi$ outside the metal at the metal surface ($z=0$) generated directly by the source coil shall be designated as $A_s$ and the component of $A_\phi$ generated by the eddy currents shall be designated as $A_e$. $A'_s$ and $A'_e$ represent these same components inside the metal at the metal surface. The usual boundary conditions prevail at the surface of the sheet 33, and accordingly the component of $B$ extending in the direction of the $z$-axis, $B_z$, and the components of $H$ perpendicular to the $z$ direction, $H_r$ and $H_\phi$, are continuous at the surface of the sheet 33. The fact that the $B_z$ is continuous at the surface means that the vector potential component $A_\phi$ at the surface is continuous. Accordingly:

$$(A_s + A_e) = (A'_s + A'_e).\qquad(8)$$

Since $H_r$ and $H_\phi$ are continuous, $H_r$ outside the metal equals $H_r$ inside the metal at the metal surface. Thus, since $H_r$ outside the metal is equal to $-(1/\mu_0)(\delta/\delta z)(A_s + A_e)$ the following expression can be written relating $H_r$ inside the metal to $(A_s + A_e)$.

$$-(1/\mu_0)(\delta/\delta z)(A_s + A_e) = H_{r\ inside}.\qquad(9)$$

The $H_\phi$ components vanish.

An impedance of the electromagnetic field may be defined as the ratio of transverse components; that is, as $Z \equiv E/H$ which is the idealized system of FIG. 2 becomes:

$$Z \equiv E_\phi/H_r.\qquad(10)$$

The metal sheet 33 can be considered to be a terminated transmission line having a front surface terminal impedance defined as:

$$Z(l) = Z_0(Z_0 \sinh \gamma l + Z_R \cosh \gamma l)/(Z_0 \cosh \gamma l + Z_R \sinh \gamma l),\qquad(11)$$

in which $Z_0$ is the characteristic impedance and is given approximately by:

$$Z_0 \approx -\sqrt{\mu\mu_0\omega/\sigma}\,(1+j)/\sqrt{2},$$

and exactly by $$Z_0 = -j\mu\mu_0\omega/\gamma.$$

The complex propagation constant $\gamma$ is found in equation 7 and is given approximately by:

$$\gamma \approx \sqrt{\mu\mu_0\omega\sigma}\,(1+j)/\sqrt{2},$$

and exactly by $$\gamma = (j\mu\mu_0\omega\sigma + q_i^2).$$

The approximations neglect the small contribution to $Z_0$ and $\gamma$ provided by $q_i$. $Z_r$ is the far side terminal impedance of free space adjoining the metal sheet and equals $-(j\omega\mu_0/q_i)$. This ratio for the far side terminal impedance is not the 376.6 ohms usually quoted for free space impedance because the analysis is not dealing with a propagating wave in the free space region. Inside the metal at the front surface $H_r$ can be expressed in terms of $E_\phi$ as follows:

$$H_{r\ inside} = (E_{\phi\ inside}/Z(l)),\qquad(12)$$

in which $E_{\phi\ inside}$ is the value of this component at the metal surface just inside the metal. Since $E_{\phi\ inside} = -j\omega(A'_s + A'_e)$ equation (12) can be restated as follows:

$$H_{r\ inside} = -j\omega(A'_s + A'_e)/Z(l)\qquad(13)$$

Substituting the value of $H_r$ from equation 9 in equation 13, the following equation results:

$$-(1/\mu_0)(\delta/\delta z)(A_s + A_e) = -j\omega(A'_s + A'_e)/Z(l).\qquad(14)$$

The partial derivative $\delta/\delta z\,(A_s + A_e) = q_i(-A_s + A_e)$ and since $A'_s + A'_e = A_s + A_e$, equation 14 can be rewritten as follows:

$$(q_i/\mu_0)(-A_s + A_e) = [j\omega/Z(l)](A_s + A_e).\qquad(15)$$

If equation 15 is solved for $A_e$, the following results:

$$A_e = -A_s[q_i + j\omega\mu_0/Z(l)]/[-q_i + j\omega\mu_0/Z(l)]. \tag{16}$$

For thin metal sheets ($\gamma l < 1$) the value $Z(l)$ can be approximated as follows:

$$Z(l) = \frac{Z_R}{1+\frac{Z_R}{Z_0}\gamma l} = \frac{\omega^2\mu_0^2 q_i^{-2}\sigma l + j\omega\mu_0 q_i^{-1}}{1+\omega^2\mu_0^2 q_i^{-2}\sigma^2 l^2}. \tag{17}$$

It will be noted in equation 17 that the value $Z(l)$ is independent of the relative permeability of the metal sheet. If the value for $Z(l)$ given in equation 17 is substituted in equation 16, and the resulting equation is simplified subject to the further restriction that $lq_i$ is small compared to 1, the following equation is obtained:

$$A_e = -A_s(1 + [j2q_i/\omega\mu_0\sigma l]). \tag{18}$$

From equation 18 the tangent of the phase angle $\theta_i$ of $A_e$ relative to $A_s$ is represented by the following equation:

$$\tan\theta_i = 2q_i/\omega\mu_0\sigma l. \tag{19}$$

Accordingly, if the values of $q_i$, $\omega$, and $\sigma$ are known, the thickness $l$ can be measured by measuring the tangent of $\theta_i$. As pointed out above, these calculations were made assuming operation in a single mode. If all the terms of the series are summed, the tangent of the total phase angle of $A_e$ relative to $A_s$ will be represented by the following equation:

$$(\tan\theta)_{z=0} = \frac{2}{\omega\mu_0\sigma l}\frac{\sum_i a_{is}q_i}{\sum_i a_{is}}. \tag{20}$$

Equation 20 represents the tangent of the angle between $A_e$ and $A_s$ at the surface of the metal ($z=0$). The probe which will provide an indication of the angle between $A_e$ and $A_s$ will not be located at the surface of the metal but will be located at a distance $z_0$ from the metal surface. The term $a_{is}$ in equation 20 will vary with $z_0$ as follows: $a_{is} = a'_{is} e^{-q_i z_0}$, in which $a'_{is}$ is the source amplitude, which is invariant with the position of the probe. There is a similar attenuation in $A_e$ at the probe relative to its value at the metal surface. Accordingly, at the position of the probe where $z = -z_0$, the following equation for tangent $\theta$ results:

$$(\tan\theta)_{z=-z_0} = \frac{2}{\omega\mu_0\sigma l}\frac{\sum_i a'_{is}q_i e^{-2q_i z_0}}{\sum_i a'_{is}e^{-2q_i z_0}}. \tag{21}$$

Thus, it will be apparent from equation 21 that the tangent of $\theta$ is in general dependent upon the value of $z_0$ and thus is dependent upon the distance of the probe from the metal sheet if there are a plurality of different modes being generated by the coil. If the source coils of the probe could be designed so that the vector potential contained only a single mode $q$ then the expression for the tangent of $\theta$ would be as follows:

$$(\tan\theta)_{z=-z_0} = (2/\omega\mu_0\sigma l)[(a'_s q e^{-2qz_0})/(a'_s e^{-2qz_0})], \tag{22}$$

which can be reduced to:

$$(\tan\theta)_{z=-z_0} = (2q/\omega\mu_0\sigma l). \tag{23}$$

In equation 23 it will be noted that the value of tangent $\theta$ is independent of $z_0$ as is desired. It is physically impossible to provide a source coil of finite dimensions such that the vector potential contains only a single mode $q$. As a practical matter, however, the right side of equation 21 can be made substantially constant with the required accuracy over a range of $z_0$ as is described below.

$\vec{B}$ is related to $\vec{A}$ as $\vec{B} = \nabla \times \vec{A}$. Accordingly, the component $B_z$ can be expressed as follows:

$$B_z = -\frac{1}{r}\frac{\partial}{\partial r}\left(r\sum_i a_{is}J_1(q_i r)e^{-q_i z}\right), \tag{24}$$

which reduces to:

$$B_z = -\sum_i a_{is}q_i J_0(q_i r)e^{-q_i z}. \tag{25}$$

On the $z$-axis where $r = 0$ the expression for $B_z$ reduces to the following equation:

$$B_{z,o} = -\sum_i a_{is}q_i e^{-q_i z}. \tag{26}$$

in which $B_{z,o}$ represents $B_z$ in the $z$-axis. In the region of free space, a magnetic scalar potential $\Phi$ may be defined such that $\vec{B} = \nabla\Phi$. Along the $z$-axis the expression for $B_{z,o}$ can be written as follows:

$$B_{z,o} = -\sum_i a_{is}q_i e^{-q_i z} = -\frac{d\Phi_0}{dz}, \tag{27}$$

in which $\Phi_0$ is the value of $\Phi$ on the $z$-axis. Accordingly, $\Phi_0'$ can be defined as follows:

$$\Phi_0' = \frac{d\Phi_0}{dz} = \sum_i a_{is}q_i e^{-q_i z}, \tag{28}$$

Thus the magnetic scalar potential $\Phi_0$ can be expressed as follows:

$$\Phi_0 = \int \Phi_0' dz = \int \sum_i a_{is}q_i e^{-q_i z}dz, \tag{29}$$

which reduces to:

$$\Phi_0 = -\sum_i a_{is}e^{-q_i z} + C. \tag{30}$$

In equation 30, $C$ is an arbitrary constant which shall be taken to be 0, since the probe only responds to dynamic fields. The ratio of $\Phi'_0$ to $\Phi_0$, with $a_{i_s}'$ now referred back to the source at $z = -z_o$, is as follows:

$$\frac{\Phi_0'}{\Phi_0} = \frac{\sum_i a_{i_s} q_i e^{-q_i(z+z_o)}}{\sum a_{i_s}' e^{-q_i(z+z_o)}}. \quad (31)$$

This expression for the ratio of $\Phi_0'$ to $\Phi_0$ becomes the same generalized ratio given in equation 21 for the tangent of $\theta$, if $z$ is made equal to plus $z_o$, which is shown in FIG. 2 is the position of the image of the source 31 on the other side of sheet 33. Thus, if the source is designed so that $\Phi_0'/\Phi_0$ is substantially constant for $z = +z_o$ over the desired range of $z_o$, the value of tangent $\theta$ will be correspondingly constant over this same range of $z_o$. This means that in order for the phase angle $\theta$ to be constant as the distance between the coil and the sheet is varied, the coil should be designed so that without the sheet present, $\Phi_0'/\Phi_0$ is constant over a range of distance from the source coil which range is centered at twice the average stand off distance that the coil is to be spaced from the front of the metal sheet. The range in which $\Phi_0'/\Phi_0$ is maintained constant and the precision with which $\Phi'_0/\Phi_0$ is maintained constant in this range determines the range over which the distance between the source coil and the probe may vary while providing a constant phase angle $\theta$ and the precision with which the phase angle is maintained constant in the range. In order to make $\Phi_0'/\Phi_0$ constant over a range about a reference point, $\delta^n/\delta z^n(\Phi_0'/\Phi_0)$ is made equal to zero at the reference point for $n = 1, 2, \ldots$ The range of selected $n$ depends upon the precision with which and the range over which the tangent of $\theta$ is to be maintained constant. The requirement that $\delta^n/\delta z^n(\Phi_0'/\Phi_0)$ equals zero means $$\Phi_0'/\Phi_0 = \Phi_0''/\Phi_0' = \cdots = \text{constant}. \quad (32)$$

A source structure designed so that equation 32 is true at twice the average distance of the metal sheet from the probe thus will yield eddy current thickness measurements which are substantially constant as the distance between the probe and the metal sheet varies over a range of $z_o$. If an infinite number of terms in equation 32 were included (an unphysical condition), then a single mode $q$ would be obtained having a value $q_o = -\Phi_0'/\Phi_0$ and $\Phi_0$ would vary as a single exponential along the entire $z$-axis. Accordingly, the probe of the present invention, in order to provide a measurement which does not vary substantially with the distance of the probe from the metal sheet, is designed so that $\Phi_0$ approaches a single exponential in its variation along the $z$-axis and in particular is designed so that $\Phi_0$ best approximates this exponential variation over a range centered at a distance from the source equal to twice the stand-off distance of the probe.

Figure 3:
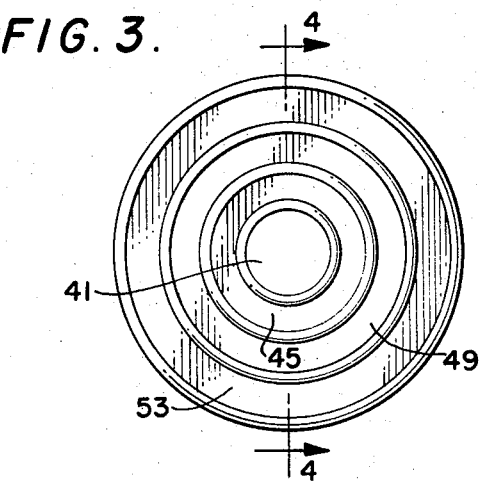
FIG. 3 is a plane view of a probe containing a transmitting and receiving coil of the thickness gauges of the present invention.
Figure 4:
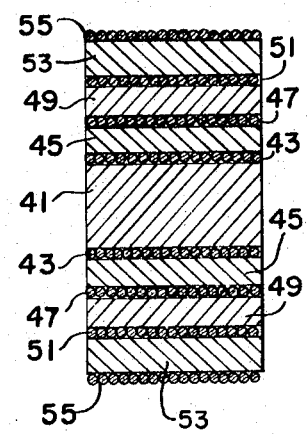
FIG. 4 is a sectional view taken along the lines 4-4 through FIG. 3.

FIGS. 3 and 4 illustrate the structure of the probe coil which will operate to produce an exponential variation of $\Phi_0$ along the $z$-axis at $z = +z_o$, or in other words will operate to produce a field such that:

$$\Phi_0'(z)/\Phi_0(z) = \Phi_0''(z)/\Phi_0'(z) = \Phi_0'''(z)/\Phi_0''(z) \cdots = -q_o \quad (33)$$

The probe structure as shown in FIGS. 3 and 4 comprises a central cylindrical core 41 made of a high permeability low loss material such as ferrite. A winding 43 is wound around the cylindrical core 41 so as to be capable of magnetizing the core 41 parallel to its axis. Surrounding the winding 43 is a cylindrical sleeve 45 which is also made of the same low loss material that the core 41 is made of. A winding 47 is wound on the cylindrical sleeve 45 to magnetize the cylindrical sleeve 45 parallel to the common axis of the sleeve 45 and the core 41. Surrounding the winding 47 coaxial with the core 41 is a second cylindrical sleeve 49 also made of the same low loss material as the core 41. A winding 51 is wound on the sleeve 49 to be capable of magnetizing the sleeve 49 parallel to the common axis. A third cylindrical sleeve 53 coaxial with the core 41 surrounds the winding 51. The sleeve 53 is also made of the same low loss material of which the core 41 is made. A winding 55 is wound on the sleeve 53 to magnetize the sleeve 53 parallel with the common axis. Additional cylindrical sleeves and windings may be provided to increase the precision with which the probe will produce an exponential scalar potential and thus increase the precision with which the phase angle output of the probe is maintained constant as the distance of the probe from the metal varies and also the range over which the distance between the probe and the metal sheet can vary while maintaining the phase angle constant. Satisfactory results, however, are obtained with a single core and a single cylindrical sleeve surrounding the core with two windings, such as just the core 41, the sleeve 45, and the windings 43 and 47.

In order to get the probe structure shown in FIGS. 3 and 4 to produce an exponential variation in scalar potential $\Phi_0$ along the $z$-axis at the point where $Z = +z_o$, the coils 43, 47, 51, 55 must magnetize the core 41 and the sleeves 45, 49 and 53 in phase or in counterphase with ampere turn amplitudes determined as will be explained below. The windings are connected in series and have different number of turns and are wound with different polarities to provide the desired ampere turn amplitudes and senses. Preferably the cylindrical sleeves are sized so that their average radii occur near the peaks of the Bessel function $J_o(q_o r)$ (See 25) which is taken from equation 25, $q_o$ being the single mode $q$ which the probe is designed to simulate. If the cylindrical core 41 and the cylindrical sleeves 45, 49, 51 are each uniformly magnetized parallel to their axis, the effect of these elements on the field produced can be almost completely represented by a magnetic charge density $\sigma_m$ on the end surfaces of the cylindrical core and cylindrical sleeves. The fields and potentials due to the cores are large compared to those of the windings energizing them, so the latter may be neglected for illustrative calculations, but must also be taken into account in final adjustment. Accordingly, the computation of the signal strength to be applied to each winding is reduced to a straight forward exercise in scalar (magnetic) potential theory. The field produced by each end surface of the cylindrical core 41 will be the field produced by a disc having a uniform charge density $\sigma_m$ on its end surfaces. The scalar potential $\Phi_0$ produced by such a disc at a point on the z-axis can be expressed in terms of $\rho$, the distance between the point and the edge of the disc, and $\alpha$, the angle between the z-axis and the cone enclosing the disc having its apex at the point on the z-axis, as follows:

$$2\Phi_0(z)/\sigma_m = \rho(1-\cos\alpha) \quad (34)$$

Accordingly, $\Phi_0'$, $\Phi_0''$, and $\Phi_0'''$ can be expressed as functions of $\rho$ and $\alpha$ as follows:

$$2\Phi_0'(z)/\sigma_m = (\cos\alpha - 1) = -2B_{z,o}/\sigma_m \quad (35)$$

$$2\Phi_0''(z)/\sigma_m = (\sin^2\alpha)/\rho \quad (36)$$

$$2\Phi_0'''(z)/\sigma_m = -3(\cos\alpha\sin^2\alpha)/\rho \quad (37)$$

To determine the contribution to $\Phi_0$ of each of the cylindrical sleeves, each cylindrical sleeve end surface is assumed to be a combination of a first disc having a radius equal to the outer radius of the cylindrical sleeve and having a uniform charge density $\sigma_m$ on its surface and a second disc having a radius equal to the inner radius of the cylindrical sleeve concentric with the outer disc and having a uniform charge density $-\sigma_m$ over its surface. The equations 34, 35, 36 and 37 can then be used to compute the combined effect of the two discs and thus the effect of each end surface of the cylindrical sleeves.

In order to simulate a single mode $q$ design, the ratio of $\Phi_0'/\Phi_0$ should be equal to the desired value of $q$ to be simulated, at a distance twice the average stand-off distance of the source coil from the metal sheet, and this ratio should hold over the predicted range of variation of the stand-off distance. This effect can be approached by making the derivatives of $\Phi_0'/\Phi_0$ zero at the reference location. From equation 33, $\Phi_0'$ can be stated in terms of $\Phi_0$ as follows:

$$\Phi_0' = -q_o \Phi_0 \quad (38)$$

$\Phi_0''$ can be stated in terms of $\Phi_o$ as follows:

$$\Phi_0'' = +q_o^2 \Phi_0 \quad (39)$$

and $\Phi_0'''$ can be stated in terms of $\Phi_o$ as follows:

$$\Phi_0''' = -q_o^3 \Phi_0 \quad (40)$$

Higher power derivatives of $\Phi_o$ can be determined in a similar manner.

The scalar potential $\Phi_o$ and its derivatives $\Phi_0'$, $\Phi_0''$, and $\Phi_0'''$ may be expressed in terms of the magnetic charge densities on case 41 and the cylindrical sleeves as follows:

$$2\Phi_0(z) = a_{11}\sigma_{m1} + a_{12}\sigma_{m2} + a_{13}\sigma_{m3} + a_{14}\sigma_{m4} = 1 \quad (41)$$

$$2\Phi_0'(z) = a_{21}\sigma_{m1} + a_{22}\sigma_{m2} + a_{23}\sigma_{m3} + a_{24}\sigma_{m4} = -q_o \quad (42)$$

$$2\Phi_0''(z) = a_{31}\sigma_{m1} + a_{32}\sigma_{m2} + a_{33}\sigma_{m3} + a_{34}\sigma_{m4} = q_o^2 \quad (43)$$

$$2\Phi_0'''(z) = a_{41}\sigma_{m1} + a_{42}\sigma_{m2} + a_{43}\sigma_{m3} + a_{44}\sigma_{m4} = -q_o^3 \quad (44)$$

in which $\sigma_{m1}$ is the charge density of cylindrical core 41, $\sigma_{m2}$ is the charge density of cylindrical sleeve 43, $\sigma_{m3}$ is the charge density of cylindrical sleeve 49 and $\sigma_{m4}$ is the charge density of cylindrical sleeve 53.

The first equation for $2\Phi_0(z)$ is arbitrarily set equal to 1. The remaining equations 42, 43, and 44 are obtained from equations 38, 39, and 40. The coefficients, $a_{ik}$ in equation 41, 42, 43, and 44 are determined by first determining $\sigma$ and $\alpha$ for the point on the z-axis equal to twice the distance of the probe from the metal sheet for each of the discs defining the front and back surfaces of the central cylindrical core 41 and each of the cylindrical sleeves 45, 49, and 53. From the values for $\rho$ and $\alpha$ for the discs defining the front and back surfaces of the cylindrical core 41, the coefficients $a_{11}$, $a_{21}$, $a_{31}$, and $a_{41}$ are determined from equations 34, 35, 36, and 37. From the values $\rho$ and $\alpha$ for the disc defining the inner and outer radii of the front and back surfaces of the cylindrical sleeve 45, the coefficients $a_{12}$, $a_{22}$, $a_{32}$ and $a_{42}$ are determined by means of equations 34 through 37. The coefficients of $\sigma_{m3}$ and $\sigma_{m4}$ in equations 41 through 44 are determined in a similar manner. When all of the $a_{ik}$ coefficients and equations 41 through 44 have been determined, the four unknowns $\sigma_{m1}$, $\sigma_{m2}$, $\sigma_{m3}$, and $\sigma_{m4}$ are solved by matrix inversion. The windings 43, 47, 51, and 55 are wound with turns as a function of the charge densities thus computed with senses corresponding to the signs of the charge densities. The probe will then approximate the desired exponential variation of $\Phi_0$ along the z-axis at the reference point and the phase angle measurement between the field due to the eddy currents and the field due to the source coil, representing the thickness and conductivity of the metal sheet, will be nearly invariant with the distance of the probe from the metal sheet over the desired range.

The pick-up coil of the probe comprises windings identical to the source coil windings wound on the core 41 and the sleeves 45, 49 and 53 and connected in series. Instead of using a pick-up coil the back emf in the same coil could be sensed using a bridge arrangement.

The above described eddy current gauge will provide a phase angle measurement such that the tangent of the phase angle is very nearly equal to $2q_o/\omega\mu_o t\sigma$ provided that $q_o$ and the frequency are properly chosen. The frequency should be chosen so that the product of the magnitude of the propagation constant $\gamma$ and the thickness is less than one. The propagation constant $\gamma$ is found in equation 7 and is defined above. For a metal sheet having a thickness of about 10 mils, and a conductivity of $3.5 \times 10^7$ mhos per meter, the frequency should be chosen to be less than 50 kilohertz. This will be low enough so that the sheet is thin compared to the skin depth. The simulated separation constant $q_o$ should preferably be chosen to be in the range of 10 to 500 meter$^{-1}$ (meter $^{-1}$ is the reciprocal of meters).

The inner core member of the probe instead of being a solid cylinder as is shown in FIGS. 3 and 4, may also be in the form of a sleeve and the charge density would then be computed for the inner sleeve in the same manner as for the other sleeves as described above.

An example of a probe which gives good results in terms of a constant phase angle as the distance between the probe and the sheet being gauged varies about a normal stand-off distance of 10 centimeters comprises just 3 sleeves. The inner sleeve in this example has an inner radius of 2 centimeters and an outer radius of 9 centimeters. The next smallest or middle sleeve, surrounding the inner sleeve, has an inner radius of 9.5 centimeters and an outer radius of 10 centimeters. The outer sleeve surrounding the other two sleeves has an inner radius of 11 centimeters and an outer radius of 11.5 centimeters. The axial length of the probe is 23 centimeters. The charge densities $\sigma_m$ for each of these sleeves are computed to simulate a constant $q_o$ of 10, and a value of $2\Phi_o = 1$, when the distance of the probe varies about a normal stand-off distance of 10 centimeters from the sheet being gauged. The computation results in the following relative charge densities for the sleeves: $-8.541$ for the inner sleeve, $+2.368$ for the middle sleeve, and $-1.756$ for the outer sleeve. The ratio of the number of turns on the sleeves to one another is selected in accordance with the ratios of these charge densities and the resulting windings are connected in series with senses corresponding to the signs of the charge densities. The resulting probe produces a relatively constant phase angle output as the distance to the probe from the sheet of metal is varied over a range of 2 centimeters about a normal distance of 10 centimeters.

Figure 5:
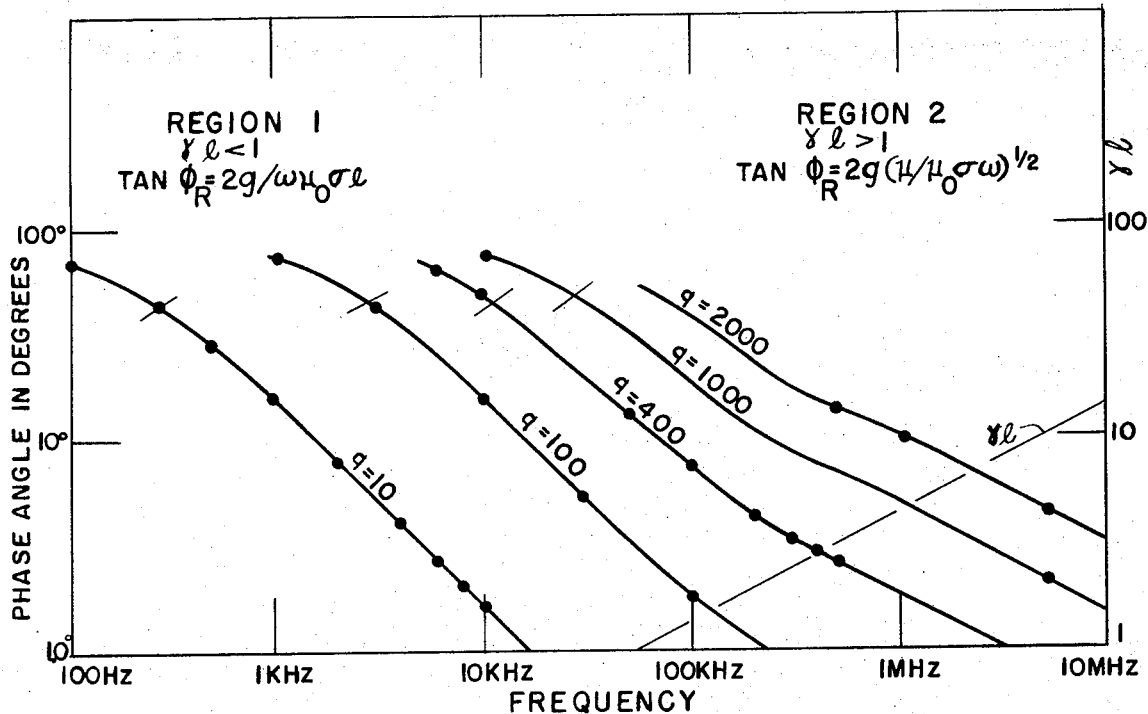
FIG. 5 is a graph showing how the phase angle detected by the system of the present invention varies with the applied frequency and also depicting the regions in which the two phase angle measurements are made in one embodiment of the invention.

Because the phase angle measurement obtained varies with conductivity, a second measurement is required in order that the thickness of the metal sheet be determined. In accordance with the present invention, a second eddy current measurement is taken to measure the phase angle difference between the field generated directly by the source coil and the field generated by the eddy currents induced in the sheet metal in the same manner as described above with reference to FIG. 1. The second phase angle measurement, however, is taken in a manner so that the phase angle between the component of the magnetic field due to the source coil and the component of the field due to the eddy currents has a different dependency on conductivity and thickness than does the measurement described above in which the tangent of the phase angle is equal to $2q_o/\omega\mu_o\sigma l$. If the phase angle has a different dependency on the thickness and conductivity, then the value of the thickness and conductivity can be obtained by solving simultaneous equations. If the frequency with which the source coils are energized is increased so that $\gamma l > 1$, in the range of 1 to 5 megahertz for the sheet used in the previous example, the tangent of the phase angle will be very nearly $2q(\mu/\mu_o\sigma\omega)$. Thus it will be observed that the phase angle has a different dependency on conductivity and thickness and in fact depends only upon conductivity. Thus from the two measurements both the thickness and the conductivity of the metal sheet can be determined. In order for the second measurement, which depends upon conductivity alone, to be large enough to be readily measured, the simulated separation constant $q_o$ of the second measurement must be made much larger than for the first measurement and in particular should be between 1,000 and 2,000 meter$^{-1}$. The curves shown in the graph of FIG. 5 illustrate the two measurements. In FIG. 5, the various curves shown illustrate how the phase angle varies with the applied frequency for a sheet of metal having a thickness of 10 mils, having a conductivity of $3.5 \times 10^7$ mhos per meter and having a relative permeability of one. Also the variation of the magnitude of the propagation constant times the thickness, $\gamma l$, is plotted. The first measurement is made in region I of this graph, where $\gamma l$ is less than one and the second measurement is made in region II above a frequency of one megahertz where $\gamma l$ is substantially greater than one. In region I, the tangent of the phase angle will be approximately equal to $2q_o/\omega\mu_o\sigma l$. In region II, the tangent of the phase angle will be approximately equal to $2q_o(\mu/\mu_o\sigma\omega)$. It will be noted that in the region II, in order to obtain a phase angle measurement of significant magnitude, the simulated separation constant $q_o$ should preferably be above 1,000 meter$^{-1}$.

While it is theoretically possible for the same source coil to be used to make both measurements by energizing the coil at the selective frequency with the proper signal amplitude and polarity applied to the windings of the coil to simulate the desired $q$, as a practical matter the source coil used to make the second measurement simulating a high $q$ will be much smaller than the source coil used to make the first simulating measurement a low $q$. The size relationship will be apparent when it is considered that the source coil was designed so that preferably the sleeves of the coil as illustrated in FIGS. 3 and 4 are located near the peaks of the Bessel function $J_0(q_o r)$. When $q$ is made large, the peaks of the Bessel function occur much closer together as $r$ varies. Also because of the large $q$ in the second measurement, the range of the distance between the source coil and the metal sheet over which the phase angle is constant is small and the source coil must be placed very close to the metal sheet. This fact does not present any insuperable problem in the second measurement because the phase angle does not depend upon the thickness. The sheet may, for example, be passed over a roller so that its position is fixed and the source coil placed closely adjacent to the sheet at the roller. Since the phase angle output measurement does not depend upon thickness because the sheet is thick compared to a skin depth, the roller will not affect the measurement and may be electrically conducting and/or magnetically permeable.

Figure 6:
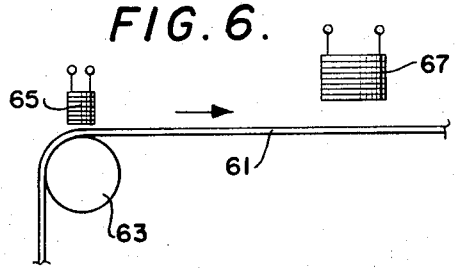
FIG. 6 schematically illustrates the embodiment for making the two measurements in the region depicted in FIG. 5.

FIG. 6 schematically illustrates the embodiment of the invention described above. As shown in FIG. 6, the thickness and conductivity of the metal sheet 61, is to be continuously measured. As the sheet 61 is moved in the direction indicated by the arrow, the sheet 61 first passes over a roller 63, where a probe 65 is positioned closely adjacent to the sheet. The probe 65 is energized at a frequency between 1 and 5 megahertz and is designed to simulate a separation constant $q_o$ of 1,000 to 2,000 meter$^{-1}$ as described above. The phase angle between the field produced by the source coil of the probe 65 and field produced by the eddy currents induced in the sheet 61 is measured in the manner described with respect to FIG. 1. The tangent of this phase angle output obtained from the probe 65, will be approximately proportional to $2q(\mu/\mu_o\sigma\omega)$. The sheet 61, after passing by the probe 65, then passes under the probe 67, which is energized in the range of 1 to 50 kilohertz. The probe 67 is designed and its energization is controlled in the manner described above, so that the phase angle output will be independent of the distance of the probe 67 from the sheet 61, and so that a separation constant $q_0$ of from between 10 and 500 is simulated. The phase angle between the field due to the source coil and due to the eddy currents in the sheet 61, is measured by the probe 67 in the manner described in FIG. 1. The tangent of this phase angle obtained from the probe 67 will be approximately equal to $2q/\omega\mu_0\sigma l$. Thus from the two phase angle measurements the thickness and conductivity of the metal sheet can be continuously determined.

If the thickness gauge does not have to measure thin sheets such as 10 mil sheets, the thickness can be measured by making a transmission measurement and a reflection measurement. A reflection measurement is one in which the phase angle between the field generated directly by the source coil and the field generated by the eddy currents is measured as described above with the pick-up coil located with the source coil. In a transmission measurement the pick-up coil is located on the opposite side of the sheet which is to have its thickness measured from the source coil.

Figure 7:
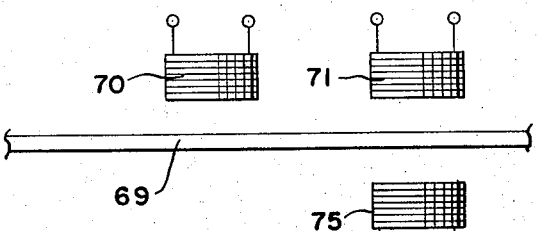
FIG. 7 schematically illustrates another embodiment of the present invention for making the two phase angle measurements in a different manner.

FIG. 7 schematically illustrates an embodiment for making a transmission measurement and a reflection measurement. As shown in FIG. 7, the sheet 69 to be gauged is moved continuously past a probe 70, containing both a transmitting coil and a receiving coil for making a reflection measurement as described above, and then past a transmitter 71, located on one side of the sheet 69 and a receiver 75, located on the opposite side of the sheet 69 from the transmitter 71. The transmitter 71 comprises a source coil wound on a cylindrical core and sleeves in the same manner as in the probe used in the reflection measurement. Similarly, the receiver 75 comprises a pick-up coil wound on a cylindrical core and sleeves identical to that of the transmitter 71.

In the transmission measurement, the phase angle measured is that between the signal detected by the receiver 75 and that detected by an identical receiver co-acting with a transmitter identical to the transmitter 71 energized in phase with the transmitter 71.

The reflection coefficient $R_H$ is defined as the ratio of the H field reflected from the front surface relative to the H field incident on the front surface from the source. The reflection coefficient can be defined by the following equation:

$$R_H = [Z_R - Z(l)/Z_R + Z(l)] = [1 - Z(l)/Z_R/1 + Z(l)/Z_R].$$

(45)

If the value for $Z_l$ given in equation 11 is substituted in equation 45, the following equation results:

$$R_H = \frac{1}{2}(Z_R/Z_0 - Z_0/Z_R) \sinh \gamma l / \cosh \gamma l + \frac{1}{2}(Z_R/Z_0 + Z_0/Z_R) \sinh \gamma l$$

(46)

The phase angle of the reflection coefficient $R_H$ is the phase angle between the field reflected from the metal sheet and field incident on the metal sheet, or in other words is the phase angle between the field generated by the eddy currents and the field generated directly by the source coil. The phase angle of the reflection coefficient $R_H$ is the phase angle which is measured by the reflection measurement in the manner described above.

Because the component $H_r$ of the vector H is continuous, $H_r$ just inside the metal will be equal to the sum of the incident $H_r$ and the reflected $H_r$ at the metal surface. The value of $H_r$ at the metal surface is designated $H_{in}$. Since $R_H$ is equal to the reflected component of H, $H_e$, over the incident component of H, $H_s$, and since $H_s + H_e$ equals $H_{in}$, the following expression can be written for the ratio of $H_{in}$ to $H_s$:

$$H_{in}/H_s = 1+R_H = [2 Z_R]/[Z_R + Z(l)] = 2/[1 + Z(l)/Z_R]$$

(47)

From standard transmission theory, $H_r$ at the far end of the transmission line divided by $H_r$ at the near end of the transmission line is given by the following equation:

$$H_{out}/H_{in} = 1/[\cosh \gamma l + (Z_R/Z_0) \sinh \gamma l]$$

(48)

in which $H_{out}$ is the value of $H_r$ at the surface of the metal on the opposite side from the source. Because of the continuity of $H_r$ at the metal surface, the value of $H_{out}$ will be the same inside and outside the metal at the surface on the far side of the metal sheet from the source. The overall transmission can be obtained by simply multiplying the quantities of equations 47 and 48. The result of the multiplication is the overall transmission coefficient T given in the following equation:

$$T = (1+R_H)(H_{out}/H_{in}) = 1/[\cosh \gamma l + \frac{1}{2}(Z_R/Z_0 + Z_0/Z_R) \sinh \gamma l]$$

(49)

The phase angle of the transmission coefficient T will be the phase angle of the field generated directly by the source relative to the field transmitted by the eddy currents to the pick-up coil and hence will be the phase angle measured by the transmission measurement described above with respect to FIG. 7. From equations 46 and 49, it will be noted that the reflection coefficient $R_H$ is the same as the transmission coefficient T multiplied in the quantity $\frac{1}{2}(Z_R/Z_0 - Z_0/Z_R)\sinh \gamma l$.

Figure 8:
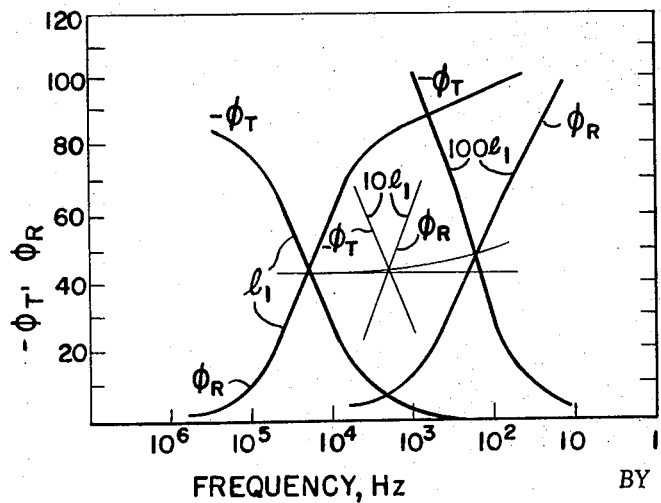
FIG. 8 is a graph showing how the detected phase angles vary with the applied frequency for different sheet thicknesses when measurements are taken in accordance with the embodiment illustrated in FIG. 7.

In FIG. 8, the phase angle of the reflection coefficient and the phase angle of the transmission coefficient versus the applied frequency are plotted for three different thicknesses 1 $l_1$, 10 $l_1$, and 100 $l_1$, $l_1$ being, for example, 1 mil. From FIG. 8, it will be noted that the plot of the phase angle of the transmission coefficient and that of the reflection coefficient intersect and at these points of intersection, the magnitudes of the phase angles of the transmission coefficient and the reflection coefficient will be equal and the signal frequency will be equal. The points where the phase angle plots intersect are referred to as the points of phase angle equality. The amount that the phase angle at the point of phase angle equality exceeds 45° is referred to as the excess angle. As the thickness is increased, the excess angle increases as a nearly linear function of the thickness. The excess angle thus is a measurement of the thickness of the metal and therefore can be used for measuring the metal thickness if the thickness is substantially greater than 10 mil. At 10 mils the phase angle approaches 45° so closely that it is not a sensitive measure of thickness. The excess angle is a precise measurement of the metal thickness regardless of the conductivity of the metal sheet. If two pieces of metal have the same thickness but different conductivities, they will produce curves identically shaped to those shown in FIG. 8, but the material having a lower conductivity will have the curves displaced on the frequency scale toward higher frequency. The point of phase angle equality between two curves will exceed 45° by exactly the same amount for both metal sheets.

The sum of the magnitudes of the phase angle of the reflection coefficient and the phase angle of the transmission coefficient is a measure of the phase angle of the numerator of the reflection coefficient $\frac{1}{2}(Z_R/Z_o - Z_o/Z_R)$ sinh $\gamma l$ and at the point of phase equality, the magnitude of each phase angle is one-half of this sum. The value of $\gamma$ depends upon the square root of the product of the conductivity and the frequency and can be made a constant for different conductivities of changing the frequency accordingly. By making the phase angle of the transmission coefficient equal the phase angle of the reflection coefficient, the frequency is varied to make the value of $\gamma$ constant for different conductivities and thus the determination of the quantity $\frac{1}{2}(Z_R/Z_o - Z_o/Z_R)$ sinh $\gamma l$ is an evaluation solely of the thickness with the variation due to conductivity removed.

Instead of using the point where the magnitudes of the phases of the transmission coefficient and the reflection coefficient become equal, any constant phase difference between the transmission coefficient and the reflection coefficient at the same frequency can be used in a similar manner to determine the thickness. By making the phase difference a selected constant value, the variation of $\gamma$ in the numerator of the reflection coefficient is eliminated.

The reciprocal of the frequency at the point of phase equality or point of fixed phase difference is a direct measure of the product of the conductivity and thickness. Having determined thickness from the excess phase angle, the conductivity can be readily determined.

The use of the excess angle to determine thickness and conductivity in the manner described above is in effect the simultaneous solution to these equations 46 and 47 to determine these values.

The transmitting and receiving coil in the thickness gauges described above are cylindrical and are designed using cylindrical coordinates to simulate a single mode so that the distance between the transmitting and receiving coils can vary without changing the detected phase angle. Alternately, the transmitting and receiving coils can be in the form of a rectangular array which is designed in a similar manner using rectangular coordinates to simulate a single mode $q$.

Many other modifications may be made to the above described preferred embodiments without departing from the spirit and scope of the invention, which is defined in the following claims.

I claim:

1. An eddy current thickness gauge for measuring the thickness of an electrically conducting sheet comprising transmitting means for generating a magnetic field to induce eddy currents in said sheet, and receiving means for detecting the phase of the magnetic field generated by the eddy currents induced in said sheet, said transmitting means generating a magnetic field shaped to approximately simulate single mode operation in which the field is characterized by a single separation constant whereby the phase angle of the field generated by said eddy currents detected by said receiving means does not vary substantially with variations in the distance between said transmitting means and said sheet.

2. An eddy current thickness gauge as recited in claim 1 wherein said transmitting means comprises a plurality of windings spaced from one another in a predetermined geometric pattern, said windings being connected in series and having turn ratios selected to generate said shaped magnetic field.

3. An eddy current thickness gauge as recited in claim 1, wherein said transmitting means comprises a plurality of low reluctance concentric sleeves, a winding wound on each of said sleeves, the ratio of the ampere turns of each of said windings being selected to generate said shaped magnetic field.

4. An eddy current thickness gauge as recited in claim 3, wherein the windings are connected in series.

5. An eddy current thickness gauge as recited in claim 3, wherein said sleeves are sized to have radii which occur at the peaks of the Bessel function $J_o$ (qr) in which q is said separation constant and r is the radius from the center of said concentric sleeves to one of said sleeves.

6. An eddy current thickness gauge as recited in claim 3, wherein said receiving means comprises a plurality of windings identical to the windings of said transmitting means.

7. An eddy current thickness gauge for measuring the thickness of a conducting sheet comprising transmitting means for generating a magnetic field to induce eddy currents in said sheet, and receiving means for detecting the phase of the magnetic field generated by the eddy currents induced in said sheet, said transmitting means generating a magnetic field shaped so that the scalar magnetic potential without said sheet being present would vary as a single exponential along an axis perpendicular to said sheet over a range centered at a distance selected to be twice the nominal distance said sheet is to be spaced from said transmitting means whereby the phase angle of the field generated by said eddy currents detected by said receiving means does not vary substantially with variations in the distance between said transmitting means and said sheet, within said range.

8. A transmitter for an eddy current thickness gauge comprising a plurality of concentric cylindrical sleeves of low reluctance material, and a plurality of windings each wound on one of said cylinders, said sleeves being sized to have radii which occur at the peaks of the bessel function $J_o$ (qr) in which $q$ is a selected separation constant characterizing the field to be generated by said transmitter r is the radius from the center of said concentric sleeves to one of said sleeves.

9. A transmitter for an eddy current thickness gauge as recited in claim 8, wherein said windings are connected in series and have turn ratios selected to generate a magnetic field shaped to simulate single mode operation in which said field is characterized by a single operation constant which is $q$.

10. A transmitter for an eddy current thickness gauge comprising a plurality of concentric cylinders of low reluctance material, a plurality of windings connected in series each wound on one of said cylinders, the turn ratios of said windings being selected to simulate single mode operation in which the magnetic field generated by said windings is characterized by a single separation constant.

11. A method of measuring the thickness of a conducting metal sheet comprising inducing eddy currents at a first frequency in said sheet to generate with said eddy currents a first magnetic field having a phase depending upon both the parameters, thickness and conductivity of said sheet, in accordance with a first functional relationship and inducing eddy currents at a second frequency to generate with said eddy currents a second magnetic field having a phase depending upon only one of said parameters in accordance with a second functional relationship, detecting the phases of said first and second magnetic fields whereby the thickness and conductivity of said sheet can be determined by simultaneous solution of said first and second functional relationships.

12. A method as recited in claim 11, wherein said eddy currents of said first frequency are induced in said sheet by a magnetic field characterized predominantly by a first low separation constant and wherein eddy currents of said second frequency are induced by a magnetic field characterized predominantly by a second substantially higher separation constant.

13. A method as recited in claim 12, wherein said first frequency is less than 50 kilohertz, said second frequency is 1 to 5 megahertz, said first separation constant is less than 500 meter$^{-1}$ and said second separation constant is greater than 500 meter$^{-1}$.

14. A method as recited in claim 11, wherein said eddy currents of said first frequency are induced by a magnetic field shaped to simulate single mode operation in which said field is characterized by a single separation constant and wherein said eddy currents of said second frequency are induced by a magnetic field characterized predominantly by a second separation constant substantially longer than said first separation constant.

15. An eddy current thickness gauge for measuring the thickness of a conducting sheet comprising means to induce eddy currents in said sheet to generate with said eddy currents a first magnetic field having a phase depending on both parameters, thickness and conductivity of said sheet, in accordance with a first equation and to generate with said eddy currents a second magnetic field having a phase depending upon only one of said parameters in accordance with a second equation, means to detect the phase of said first magnetic field, means to detect the phase of said second magnetic field, whereby the thickness and conductivity of said sheet can be determined by a simultaneous solution of said first and second equations.

16. An eddy current thickness gauge for measuring the thickness of a conducting sheet comprising first transmitting means for inducing eddy currents in said sheet to generate with said eddy currents a first magnetic field having a phase depending upon both the parameters, thickness and conductivity of said sheet, in accordance with a first equation, second transmitting means for inducing eddy currents in said sheet to generate with said eddy currents a second magnetic field having a phase depending upon only one of said parameters in accordance with a second equation, means to detect the phase of said first magnetic field, and means to detect the phase of said second magnetic field, whereby the thickness and conductivity of said sheet can be determined by siultaneous solution of said first and second equations.

17. An eddy current thickness gauge as recited in claim 16 wherein said first and second detecting means are on the same side of said sheet as said first and second transmitting means respectively.

18. An eddy current thickness gauge as recited in claim 16 wherein said first detecting means is on the same side of said sheet as said first transmitting means and said second detecting means is on the opposite side of said sheet from said second transmitting means.

* * * * *